May 17, 1932.   J. FLACHBART   1,858,733
TAP FORMING MACHINE
Filed Aug. 31, 1927   4 Sheets-Sheet 1
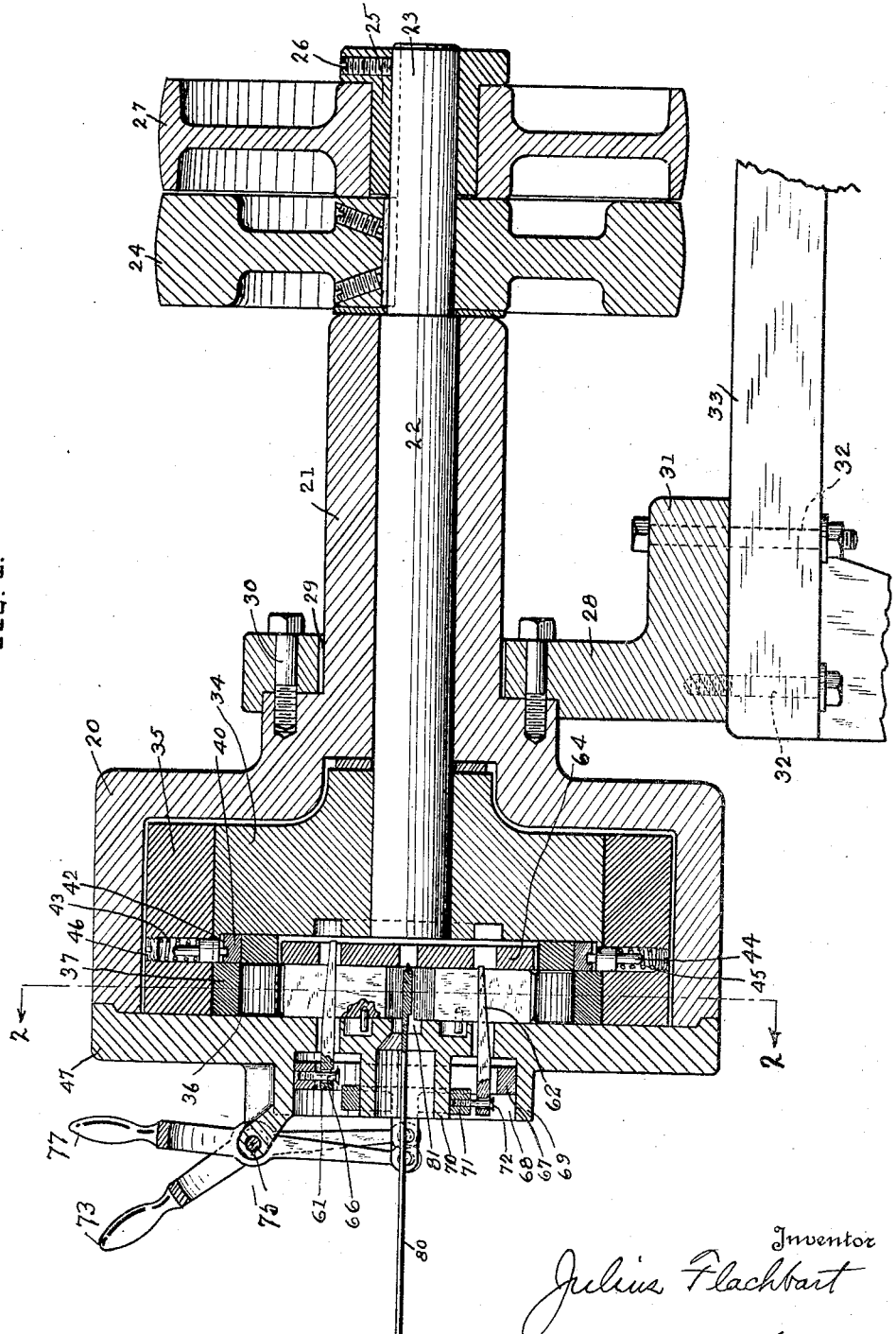

May 17, 1932.  J. FLACHBART  1,858,733
TAP FORMING MACHINE
Filed Aug. 31, 1927  4 Sheets-Sheet 2

Inventor
Julius Flachbart
Kwis Hudson & Kent
Attorney

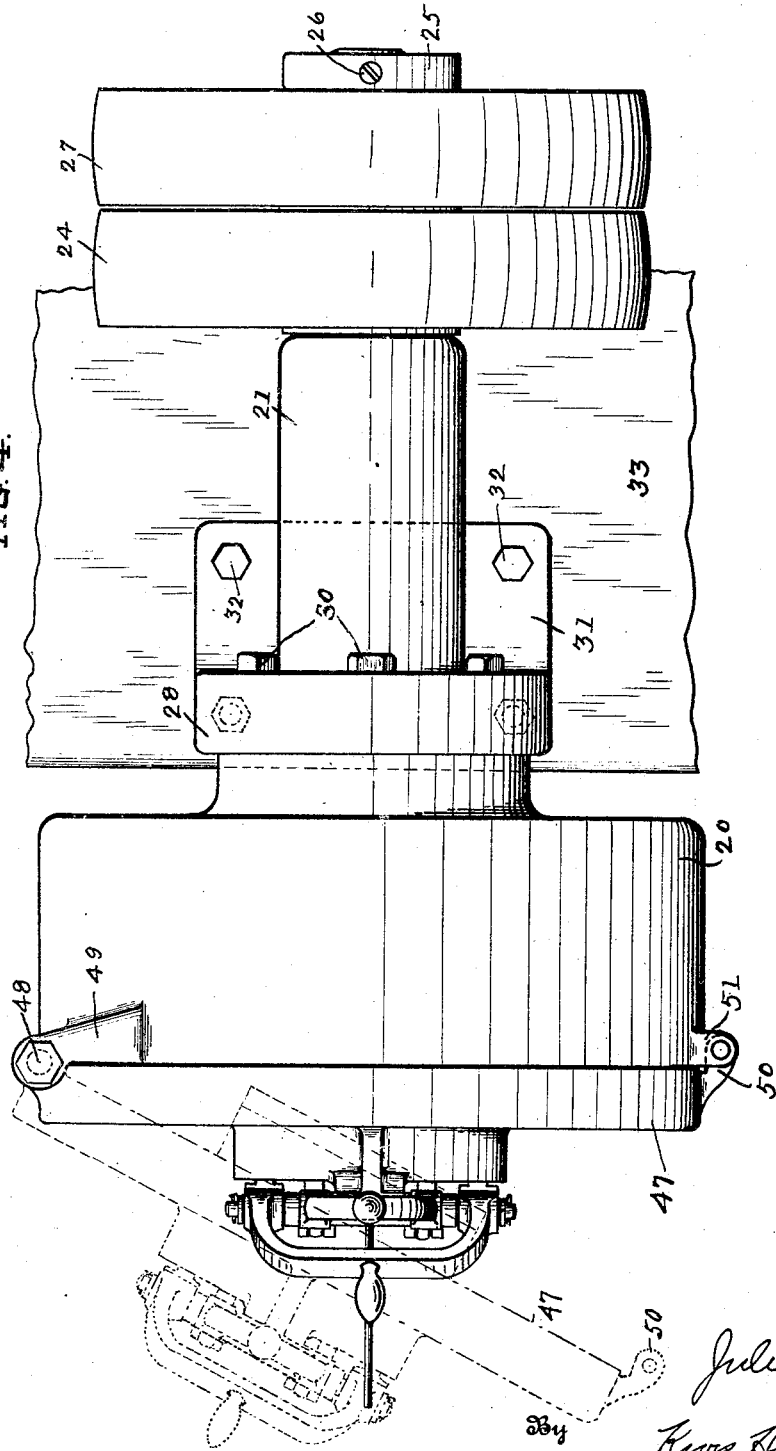

May 17, 1932.  J. FLACHBART  1,858,733
TAP FORMING MACHINE
Filed Aug. 31, 1927  4 Sheets-Sheet 4
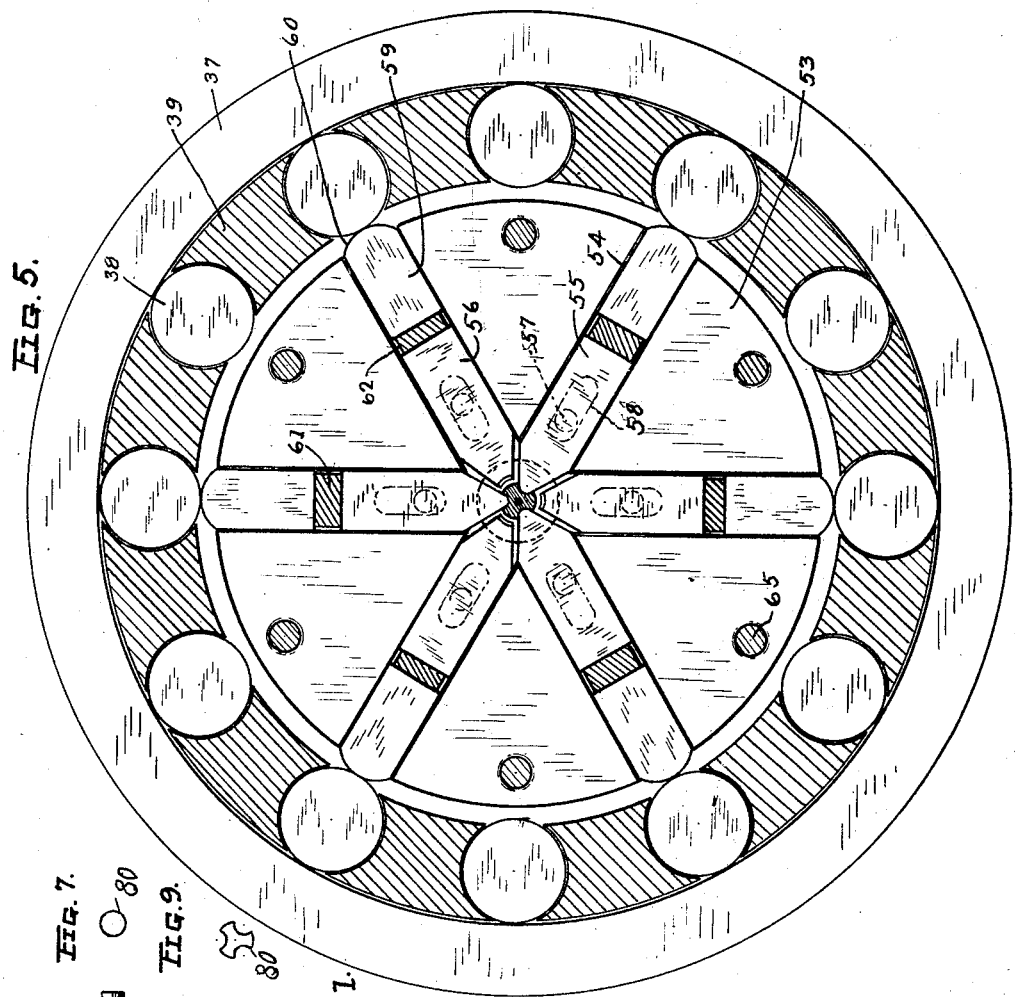

Patented May 17, 1932

1,858,733

UNITED STATES PATENT OFFICE

JULIUS FLACHBART, OF KENT, OHIO

TAP FORMING MACHINE

Application filed August 31, 1927. Serial No. 216,709.

This invention relates to a machine for forming taps and the like, and more particularly to a machine wherein the taps are formed upon the end of a steel rod by what might be termed a swaging operation.

The principal object of the invention is to provide a machine adapted to form a tap on a shank which latter is of uniform diameter throughout its entire length before the tap forming operation, which method of forming taps is quite different from the methods now employed wherein the taps are cut independently and subsequently welded onto the shank or cut out of a rod of larger diameter and the shank afterwards turned down to the desired diameter.

Furthermore, it is an object of the invention to provide a machine which will form these taps on the ends of the rods of uniform diameter in substantially a single operation and in a very limited time thereby materially reducing the cost in connection with the manufacture of these taps as compared with other methods at present employed, and still provide a tap of excellent quality.

Another object of the present invention is to provide a machine of the type referred to in which a length of rod of uniform diameter is inserted into the machine and which latter is provided with means for forming the flutes of the tap and subsequently the threads of the tap.

In the customary methods of forming taps of the type referred to, a length of material in rod form is selected, the diameter of which throughout corresponds substantially to the finished diameter of the tap. This rod is then turned down to form the shank of the tap leaving an enlarged portion of the rod upon the end of the shank from which to form the tap. The enlarged end on the shank is then placed in a milling machine and the flutes cut into the enlarged end individually. After this operation the threads are cut or rolled onto the portions of the metal extending between the flutes and finally the end of the enlarged portion is ground down to form the point of the tap. The tap is then suitably hardened and ready for use.

The other way of making taps is to select a piece of material in rod form of desirable size to form the shank of the tap and to select a piece of material of enlarged diameter into which may be formed the tap in the manner above described. The tap in finished condition is provided with a short reduced shank of a diameter equal to the diameter of the rod forming the main portion of the shank and the two are butt welded.

It will be readily seen from the foregoing methods of forming taps that considerable time is expended in making a finished tap as well as considerable material wasted and it is, therefore, one of the important features of the present invention to eliminate this waste of material as well as to produce a completed tap in a considerably less period of time.

Another object of the present invention is to provide a machine which is adapted to form taps of various sizes without alteration in the machine other than the changing of the fluting and threading dies to the desired sizes.

The method in forming taps which is apparently new in the art, insofar as I am aware, consists in forming a tap on the end of a rod of equal diameter throughout its length, whereby the material for the threaded portion of the tap is built up as a result of the fluting operation upon the rod, whereas heretofore it has been necessary to provide, in some manner or other, a portion of enlarged diameter adapted to be formed into a tap.

With the objects above indicated and other objects hereinafter explained in view, my invention consists in the construction and combination of elements hereinafter defined and claimed.

Referring to the drawings:

Fig. 1 is a longitudinal cross sectional view of the machine embodying the present invention.

Fig. 4 is a top plan view of the machine indicating in dotted lines the manner in which the front cover plate of the machine swings open to permit access to the interior thereof for changing the fluting and threading dies.

Fig. 5 is a transverse sectional view on an enlarged scale showing the fluting dies acting upon the rod.

Fig. 6 illustrates a section of rod upon which the tap is to be formed.

Fig. 7 is an end view of the rod in Fig. 6.

Fig. 8 illustrates the first step in the operation of forming a tap on the end of the rod in Fig. 6, which consists in providing the flutes in the end of the rod.

Fig. 9 is an end view of the fluted portion of the rod.

Fig. 10 is a view showing the rod after the threads have been provided thereon and the end ground to provide an entrant point.

Fig. 11 is an end view of the rod illustrated in Fig. 10.

Fig. 12 is a fragmentary sectional view showing the wedges for controlling the action of the dies upon the rod, the said wedges being in reversed position to those shown in Fig. 1.

Figure 3:
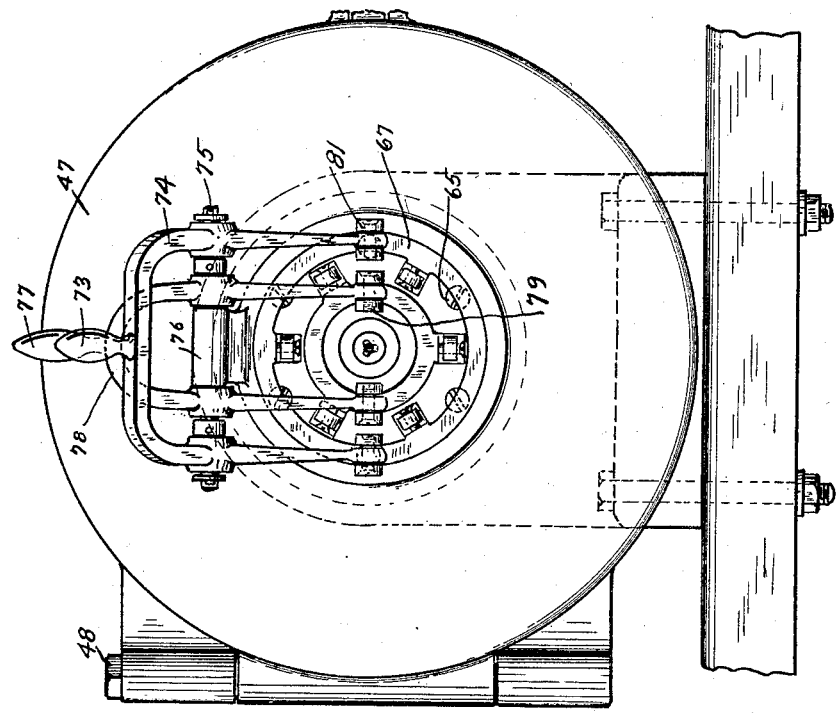
Fig. 3 is an end elevational view of the machine shown in Fig. 1.
Figure 2:
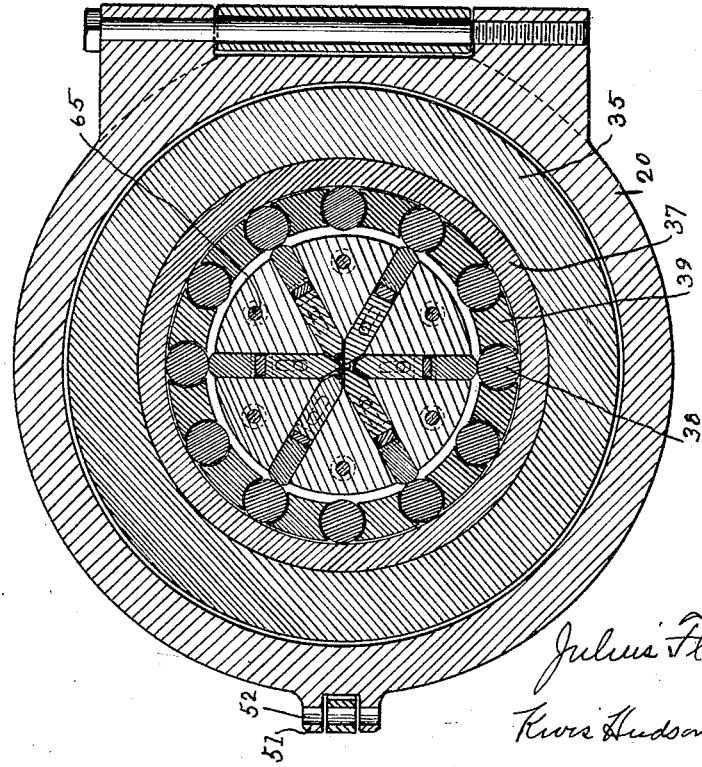
Fig. 2 is a transverse cross sectional view taken on line 2—2 of Fig 1. and showing the relative position of the flutting and threading dies.

Referring to the drawings, the machine comprises a cylindrical housing 20 adapted to be supported on a bench or other structure, and a tubular extension 21 is formed integrally therewith and within which extension is rotatably supported a horizontally extending shaft 22. The rear end of the shaft 22 is reduced at 23, and keyed thereto adjacent the end of the tubular extension 21 is a fixed pulley 24 which may be connected to any suitable source of power for the purpose of rotating the shaft 22. Upon the reduced end 23 of the shaft 22 and beyond the fixed pulley 24 is a bushing or sleeve 25 secured to the shaft 22 by a set screw 26. This bushing 25 freely supports a loose pulley 27 of the same diameter as the fixed pulley 24 and is positioned adjacent thereto so that the driving means for the fixed pulley 24 can be shifted at will to the loose pulley 27 when it is desired to stop the rotation of the shaft 22. While the type of driving mechanism herein illustrated operates effectively it is to be understood that any other driving means may be employed for causing rotation of the shaft 22.

A bracket 28 is provided with an opening 29 of sufficient diameter to receive therein the tubular extension 21 of the housing 20 and is securely fastened to a portion of the housing, as shown in Fig. 1, by a plurality of bolts 30. The lower end of the bracket 28 is provided with a foot or base 31 and is securely attached by means of bolts 32 to a bench 33 or other supporting structure.

The forward end of the shaft 22 terminates within the cylindrical housing 20 and has shrunk or otherwise secured to its forward end a cylindrical cast iron hub member 34 adapted to rotate therewith. A steel ring or collar 35 is shrunk or otherwise fastened upon the cast iron hub member 34 and the forward end of the ring substantially overlaps the forward end of the cast iron hub 34 to thereby provide a substantially circular pocket 36 within the housing adapted to receive the elements which support the fluting dies and threading dies and which construction will be hereinafter more specifically described.

Upon the inner forward surface of the steel ring or collar 35 is forcibly fitted a hardened steel ring 37 adapted to rotate with collar 35, which is adapted to engage, upon its inner surface, with a plurality of rollers or cams 38, which latter are adapted to act upon the fluting and threading dies successively to form the flutes and threads, respectively, upon the end of the rod to form the tap.

These rollers or cams 38 of which twelve are herein illustrated, although the number of rollers may be varied depending upon the number of fluting and threading dies employed, are rotatably supported in a roller bearing rack or floating rack 39. This roller bearing rack extends rearwardly beyond the extremities of the rollers or cams 38 into substantial frictional engagement with the cast iron housing 34 secured to the end of the shaft 22. The roller bearing rack, however, is adapted to rotate independently of the hub 34 so that the rollers or cams 38 are free to rotate about the inner surface of the steel ring 37 due to frictional engagement as the latter is rotated.

To control the relative movement between the roller bearing rack 39 and the steel ring 37, a friction ring 40 is secured to the inner end and upon the outer surface of the roller bearing rack 39, as clearly shown in Fig. 1. This ring 40 is provided with a circumferentially extending groove or recess 42 and is adapted to receive therein the ends of plungers 43 slidably mounted in transverse openings 44 in the steel ring or collar 35. These plungers 43 are pressed inwardly into engagement with the ring 40 by means of coil springs 45 and the tension of the springs and consequently the friction between the members is controlled by screw threaded plugs 46 adapted to engage with the screw threaded ends of the transverse openings 44. This frictional adjustment is provided for the purpose of creating enough friction between the roller bearing rack 39 and the steel ring or collar 35 to cause the rollers or cams 38 to positively pass over the ends of the fluting or threading dies until sufficient momentum has been transmitted to the shaft 22 carrying the hub 34 and steel ring or collar 35.

A cast iron cover plate 47 is preferably pivoted at 48 to a pair of ears 49 formed integrally with the outer surface of the housing 20, while diametrically opposite thereto is an ear or projection 50 which is adapted to fit between a pair of spaced extensions 51 formed integrally with the housing 20. When the cover plate 47 is moved into closed position, as indicated in Fig. 4, the ear 50 will move to a position between the extensions 51 of the housing 20 and a pin (not shown) or other means may be inserted through a plurality of cooperating openings 52 for locking the cover plate in closed engagement with the housing 20. This pivoted door is provided for the purpose of permitting access to the interior of the machine for the purpose of replacing or substituting the desirable fluting and threading dies.

The cover plate 47 is provided with an inwardly extending cylindrical portion 53 concentric with the cover plate 47 and of sufficient depth to suitably reside within the pocket 36 between the rollers 38. This portion 53 is provided with a plurality of radially extending guides or slots 54 extending angularly from the center and in this particular instance spaced 60° apart. The guides or slots 54 are adapted to slidably receive therein fluting dies 55 and thread-forming dies 56 which are positioned in the guides 54 alternately, or in other words, in every other slot there is disposed a fluting die 55, while in the intermediate guides 54 are disposed the thread-forming dies 56.

The ends of these dies extend inwardly toward the work and are adapted to be moved into engagement therewith for the purpose of providing the flutes and threads of the tap, respectively. These fluting dies 55 and thread-forming dies 56 are provided upon their outer surface with a laterally extending pin 57 adapted to reciprocate within a slot 58 formed in the cover plate 47 adjacent the respective dies, and which slot controls the limit of movement of the respective dies.

The outer portions of the guides or slots 54 are adapted to slidably receive a plurality of backer members 59 having rounded outer surfaces 60 which are adapted to be moved into the path of movement with the rotating rollers or cams 38 carried by the roller bearing rack 39. These fluting dies 55 and thread-forming dies 56 are forced into engagement with the work by means of wedges 61 and 62, respectively, engaging the fluting dies and threading dies, which wedges are provided with tapered surfaces 63 adapted to engage cooperating tapered surfaces of the backer members 59. As the wedges 61 or 62 are moved inwardly the backer members 59 are forced outwardly into the path of movement of the rollers 38, and as the rollers successively engage the backer members 59 the dies are forced into engagement with the work.

It will, therefore, be seen that as each roller 38 comes into engagement and passes over each backer member 59, the respective fluting or thread-forming dies, if their associated wedges 61 or 62 have been moved inwardly, will cause the work to be operated upon thus forming the flutes of the tap or the threads of the tap as the case may be.

To maintain these dies 55 and 56 and backer members 59 securely within the extension 53, a cylindrical plate 64 is positioned adjacent the inner edges of the dies and backer members, respectively, and secured by means of bolts 65 to the cover plate 47. This construction serves the additional advantage of maintaining the dies and backer plates upon the inner portion of the cover plate 47, so that when the cover plate is swung open about its pivot 48 access to the dies for replacement is made readily available. In other words, if the dies of the machine require changing, depending upon the size of the tap desired, and are carried by the cover plate, it will be seen that the dies are readily reached when the cover plate is in open position.

I have illustrated in the drawings and particularly in Figs. 1, 3 and 4 a manually operated means for actuating the fluting wedges 61 and thread-forming wedges 62, but it should be understood that I am not to be limited to this specific arrangement, inasmuch as these wedges may be actuated in any suitable manner so long as they can be fed inwardly or withdrawn from between the backer members 59 and the dies 55 or 56.

The wedges 61 for controlling the fluting operation of the fluting dies 55 are herein shown as three in number, spaced approximately 120° apart and the outer ends of these wedges are loosely carried by pins 66 screw-threaded or otherwise secured to the inner surface of a ring 67. This ring is slidably mounted within a bore 68 provided within an extension 69 concentric with the cover plate 47 and integrally formed upon the outer surface thereof. As the ring 67 is moved inwardly the wedges 61 cause the backer members 59 to be moved outwardly into the path of movement of the rollers 38, and as the backer members 59 are successively engaged by the rollers 38, they are forced inwardly thus forcing the fluting dies into engagement with the work. Continuous successive engagement causes the fluting dies to press the flutes into the rod. This results in producing a plurality of rapid hammer actions upon the fluting dies and results in providing flutes in the end of the rod upon which the tap is to be formed.

The cover plate 47 is provided with a tubular extension 70 concentric with the extension 69 and is adapted to slidably support upon its outer surface a ring 71. This ring 71 carries the wedges 62 which are each loosely connected thereto by means of a pin 72. These wedges 62 are positioned alternately with respect to the wedges 61 and are adapted upon inward movement to move the backer members 59 into the path of movement of the rollers 38. As the rollers successively engage the backer members 59 as the former are rotated, the thread-forming dies are forced into engagement with the work and continuous swaging produces the threads of the tap. It will, therefore, be seen that as the rollers 38 are rotated by their frictional engagement with the steel ring 37, they are caused to engage the ends of the backer members 59 thus depressing them and thereby causing the threads to be formed in the end of the tap.

The outer ring 67 can be moved inwardly or outwardly by means of a handle 73 formed upon one end of a bell crank lever 74 pivotally mounted upon a transverse shaft 75 supported by an extension 76 formed integrally with the upper portion of the cover plate 47. The lower ends of the bell crank 74 are pivotally connected to the extensions 81 provided upon the outer surface of the ring 67. The inner ring 71 is similarly moved inwardly or outwardly by means of a handle 77 formed integrally with a lever 78 which is pivoted to the shaft 75 and the lower ends of the lever 78 are pivotally connected to extensions 79 provided upon the inner ring 71.

The rod which is indicated by 80 is fed through the tubular extension 70 on the front of the cover and the interior of this tubular extension connects with the fluting and thread-forming dies by means of a central opening 81.

In the operation of the machine a piece of rod 80 of suitable length and uniform diameter throughout is introduced through the opening 81 and suitably positioned adjacent the ends of the fluting dies 55 and thread-forming dies 56. It is presumed, of course, that the wedges 61 and 62 are withdrawn to their full extent so that the backer members 59 are out of the path of movement of the rollers 38, in which case the rollers 38 will not force the fluting dies 55 or the thread-forming dies 56 inwardly towards the rod 80.

With the rod 80 positioned as heretofore described, the wedges 61 controlling the operation of the fluting dies are moved inwardly by means of the ring 67 which cause the backer members 59 to be moved outwardly into the path of movement of the rollers 38, which rollers are constantly rotated by means of their frictional engagement with the rotating ring 37. As the rollers 38 successively engage the ends of the backer members 59 a continuous hammering operation is transmitted to the end of the rod 80 through the fluting dies 55. By continuing this operation through a period of time the flutes are eventually provided in the end of the rod 80, and the material displaced from the end of the rod as the flutes are being formed is distributed substantially equally to the portions of the rod intermediate the flutes. It has been found that sufficient material is thus built up between the flutes upon which to form the threads of the tap.

When the flutes have been properly formed, the wedges 61 remain in their inward position so as to maintain the fluting dies 55 within the flutes upon the end of the rod. The wedges 62 are then moved inwardly by the ring 71 which causes the backer members 59 associated with the thread-forming dies 56 to be moved outwardly into the path of movement of the rollers 38. As each of these backer members 59 are successively engaged by the rollers 38, the thread-forming dies 56 are forced inwardly into engagement with the enlarged portions on the end of the rod within the flutes, and inasmuch as the fluting dies 55 are maintained within the flutes during this operation, the material into which the threads are to be formed is suitably supported during the threading operation. When the flutes and threads have been formed upon the end of the rod, the wedges 61 and 62 are moved outwardly so as to permit the backer members 59 to be moved out of the path of movement of the rollers 38, so that the dies are not responsive to the action of the backer members 59 and the rollers 38. The rod with the tap thus formed can then be removed and another rod inserted in its place. The aforementioned operation is then again carried through in the same manner and will be continued so long as the rods are fed into the machine. The whole operation for forming the flutes and threads upon the rod consumes only a few seconds of time, and it will be seen that there is no waste of material up to this point.

The rods with the taps thus formed upon the end are then ground to a taper upon their ends to form an entrant portion and subsequently hardened. Therefore, the only waste material results in the grinding of the ends of these taps.

While I have described the preferred construction of the machine, it is to be understood that I am not to be limited thereto inasmuch as certain changes and modifications may be made without departing from the spirit of the invention as defined in the appended claims.

Having thus described my invention, I claim:

1. In a machine of the type described, a rotatable member, means for rotating said member, a floating rack, a friction ring carried by said rack, and means carried by said rotatable member to engage said friction ring whereby said rack is rotated, rotatable members carried by said rack, a plurality of radially movable dies normally outside the path of movement of said rotatable members, and means adapted to be moved into the path of movement of said rotatable members to thereby cause said dies to be moved into engagement with the work.

2. In a machine of the type described, a rotatable member, means for rotating said member, a floating rack, a friction member carried by said rack, and means carried by said rotatable member adapted to engage said friction member whereby said rack is rotated, rotatable members carried by said rack, a plurality of radially movable dies normally outside the path of movement of said rotatable members, means adapted to be moved into the path of movement of said rotatable members, and means cooperating with said last mentioned means and said dies for moving said means into the path of movement of said rotatable members to thereby cause said dies to be moved into engagement with the work.

3. In a machine of the type described, a rotatable member, means for rotating said member, a floating rack, adjustable frictional means interposed between said rotatable member and said rack whereby said rack is rotated, rotatable members carried by said rack, a plurality of radially movable dies normally outside the path of movement of said rotatable members, slidable members adapted to be moved into the path of movement of said rotatable members, and wedges cooperating with said slidable members and said dies for moving said wedges into the path of movement of said rotatable members to thereby cause said dies to be moved into engagement with the work.

4. In a machine of the type described, a housing, a rotatable member in said housing, means for rotating said member, a floating rack, rollers mounted in said rack and in engagement with said rotatable member for causing rotation of said rack, a pivoted cover plate for said housing, radially movable dies carried by said cover plate and positioned in alignment with said rollers when said cover plate is in closed position, backer members slidably carried by said cover plate and normally out of the path of movement of said rollers, and means for moving said backer members into the path of movement of said rollers to thereby cause said dies to be moved into engagement with the work.

5. In a machine of the type described, a housing, a rotatable member in said housing, means for rotating said member, a floating rack, rollers mounted in said rack and in engagement with said rotatable member for causing rotation of said rack, a pivoted cover plate for said housing, radially movable dies carried by said cover plate and positioned in alignment with said rollers when said cover plate is in closed position, backer members slidably carried by said cover plate and normally out of the path of movement of said rollers, and means for selectively moving said backer members into the path of movement of said rollers to thereby cause the dies associated with the selected backer members to move into engagement with the work.

6. In a machine of the type described, a housing, a rotatable member in said housing, means for rotating said member, a floating rack, rollers mounted in said rack and in engagement with said rotatable member for causing rotation of said rack, a pivoted cover plate for said housing, radially movable fluting dies carried by said cover plate, radially movable threading dies carried by said cover plate, said fluting and threading dies being disposed in alternate arrangement, backer members slidably carried by said cover plate and normally out of the path of movement of said rollers, and means selectively operated for moving said backer members into the path of movement of said rollers to thereby cause said fluting dies or said threading dies to be moved into engagement with the work.

7. In a machine of the type described, a housing, a rotatable member in said housing, means for rotating said member, a floating rack, rollers mounted in said rack and in engagement with said rotatable member for causing rotation of said rack, a pivoted cover plate for said housing, radially movable fluting dies carried by said cover plate, radially movable threading dies carried by said cover plate, said fluting and threading dies being disposed in alternate arrangement, backer members slidably carried by said cover plate and normally out of the path of movement of said rollers, means for moving some of said backer members into the path of movement of said rollers to be successively engaged thereby to cause said fluting dies to be moved into engagement with the work, and means for moving other of said backer members into the path of movement of said rollers to be successively engaged thereby to cause said threading dies to be moved into engagement with the work.

8. In a machine of the type described, a housing, a rotatable member in said housing, means for rotating said member, a rotatable floating rack frictionally engaging said rotatable member, means for regulating the frictional engagement between said rotatable member and rack, a plurality of rollers supported by said rack and engaging said rotatable member, a removable cover plate connected to said housing, radial guides on the inner side of said cover plate, fluting dies slidably mounted in some of said guides, threading dies in other of said guides and in alternate relation to said fluting dies, backer members slidably mounted in said guides and normally out of the path of movement of said rollers, and means insertible between said dies and said backer members for moving the latter into the path of movement of said rollers to thereby be successively engaged by said rollers to move said dies into engagement with the work.

9. In a machine of the type described, a housing, a rotatable member in said housing, means for rotating said member, a rotatable floating rack frictionally engaging said rotatable member, means for regulating the frictional engagement between said rotatable member and rack, a plurality of rollers supported by said rack and engaging said rotatable member, a removable cover plate connected to said housing, radial guides on the inner side of said cover plate, fluting dies slidably mounted in some of said guides, threading dies in other of said guides and in alternate relation to said fluting dies, backer members slidably mounted in said guides and normally out of the path of movement of said rollers, means for moving a portion of said backer members into the path of movement of said rollers to be successively engaged thereby for moving said fluting dies into engagement with the work, and means for moving other of said backer members into the path of movement of said rollers to be successively engaged thereby for moving said threading dies into engagement with the work.

In testimony whereof, I hereunto affix my signature.

JULIUS FLACHBART.